US011946582B2

(12) United States Patent
Hampson

(10) Patent No.: US 11,946,582 B2
(45) Date of Patent: *Apr. 2, 2024

(54) BINDERS

(71) Applicants: KNAUF INSULATION SPRL, Vise (BE); KNAUF INSULATION, INC., Shelbyville, IN (US)

(72) Inventor: Carl Hampson, St. Helens (GB)

(73) Assignees: Knauf Insulation, Inc., Shelbyville, IN (US); Knauf Insulation SPRL, Vise (BE)

(*) Notice: Subject to any disclaimer, the term of this patent is extended or adjusted under 35 U.S.C. 154(b) by 753 days.

This patent is subject to a terminal disclaimer.

(21) Appl. No.: 16/405,566

(22) Filed: May 7, 2019

(65) Prior Publication Data

US 2019/0264857 A1 Aug. 29, 2019

Related U.S. Application Data

(60) Continuation of application No. 15/730,025, filed on Oct. 11, 2017, now abandoned, which is a
(Continued)

(30) Foreign Application Priority Data

| Aug. 3, 2007 | (GB) | ..... 0715100 |
| Apr. 29, 2008 | (GB) | ..... 0807777 |
| Jun. 6, 2008 | (GB) | ..... 0810297 |

(51) Int. Cl.
*F16L 59/02* (2006.01)
*C03C 13/06* (2006.01)
(Continued)

(52) U.S. Cl.
CPC ........... *F16L 59/028* (2013.01); *C03C 13/06* (2013.01); *C03C 25/32* (2013.01); *C03C 25/321* (2013.01);
(Continued)

(58) Field of Classification Search
CPC ....... C03C 13/06; C03C 25/32; C03C 25/321; C03C 25/34; C08H 8/00; C08K 5/175;
(Continued)

(56) References Cited

U.S. PATENT DOCUMENTS

| 1,801,052 A | 4/1931 | Meigs |
| 1,801,053 A | 4/1931 | Meigs |

(Continued)

FOREIGN PATENT DOCUMENTS

| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.
(Continued)

*Primary Examiner* — Shuangyi Abu Ali
(74) *Attorney, Agent, or Firm* — Knauf Insulation, Inc.; James K. Blodgett

(57) ABSTRACT

An un-reacted substantially formaldehyde free curable binder solution for binding loose matter consists essentially of a solution obtainable by dissolving a reducing sugar, an ammonium salt acid precursor, optionally a carboxylic acid or a precursor thereof and optionally ammonia in water.

20 Claims, 1 Drawing Sheet

Related U.S. Application Data continuation of application No. 14/680,508, filed on Apr. 7, 2015, now abandoned, which is a continuation of application No. 14/026,394, filed on Sep. 13, 2013, now Pat. No. 9,039,827, which is a continuation of application No. 13/341,542, filed on Dec. 30, 2011, now Pat. No. 8,940,089, which is a division of application No. 12/599,858, filed as application No. PCT/EP2008/060185 on Aug. 1, 2008, now Pat. No. 8,114,210.

(51) Int. Cl.

| | | |
|---|---|---|
| *C03C 25/32* | (2018.01) | |
| *C03C 25/321* | (2018.01) | |
| *C03C 25/34* | (2006.01) | |
| *C08H 8/00* | (2010.01) | |
| *C08K 5/17* | (2006.01) | |
| *C08K 7/14* | (2006.01) | |
| *C08L 97/02* | (2006.01) | |
| *C08L 99/00* | (2006.01) | |
| *C08L 101/02* | (2006.01) | |
| *C08L 101/06* | (2006.01) | |
| *C09D 197/02* | (2006.01) | |
| *C09D 199/00* | (2006.01) | |
| *C09D 201/02* | (2006.01) | |
| *C09D 201/06* | (2006.01) | |
| *C09K 3/00* | (2006.01) | |
| *D04H 1/4209* | (2012.01) | |
| *D04H 1/4218* | (2012.01) | |
| *D04H 1/64* | (2012.01) | |
| *E04B 1/76* | (2006.01) | |

(52) U.S. Cl.
CPC ............... *C03C 25/34* (2013.01); *C08H 8/00* (2013.01); *C08K 5/175* (2013.01); *C08K 7/14* (2013.01); *C08L 97/02* (2013.01); *C08L 99/00* (2013.01); *C08L 101/025* (2013.01); *C08L 101/06* (2013.01); *C09D 197/02* (2013.01); *C09D 199/00* (2013.01); *C09D 201/025* (2013.01); *C09D 201/06* (2013.01); *C09K 3/00* (2013.01); *D04H 1/4209* (2013.01); *D04H 1/4218* (2013.01); *D04H 1/64* (2013.01); *E04B 1/7658* (2013.01); *E04B 1/7662* (2013.01)

(58) Field of Classification Search
CPC ..... C08K 7/14; C08L 101/025; C08L 101/06; C08L 97/02; C08L 99/00; C09D 197/02; C09D 199/00; C09D 201/025; C09D 201/06; C09K 3/00; D04H 1/4209; D04H 1/4218; D04H 1/64; E04B 1/7658; E04B 1/7662; F16L 59/028
See application file for complete search history.

(56) References Cited

U.S. PATENT DOCUMENTS

| | | | |
|---|---|---|---|
| 1,886,353 A | 11/1932 | Novotny et al. | |
| 1,902,948 A | 3/1933 | Castle | |
| 1,964,263 A | 6/1934 | Krenke | |
| 2,198,874 A | 4/1940 | Leighton | |
| 2,215,825 A | 9/1940 | Wallace et al. | |
| 2,261,295 A | 11/1941 | Schlack | |
| 2,362,086 A | 11/1944 | Eastes et al. | |
| 2,371,990 A | 3/1945 | Hanford | |
| 2,392,105 A | 1/1946 | Sussman | |
| 2,442,989 A | 6/1948 | Sussman | |
| 2,500,665 A | 3/1950 | Courtright | |
| 2,518,956 A | 8/1950 | Sussman | |
| 2,875,073 A | 2/1959 | Gogek | |
| 2,894,920 A | 7/1959 | Ramos | |
| 2,965,504 A * | 12/1960 | Gogek | .............. C04B 12/00 501/112 |
| 3,038,462 A | 6/1962 | Bohdan | |
| 3,138,473 A | 6/1964 | Floyd et al. | |
| 3,222,243 A | 12/1965 | Gaston et al. | |
| 3,231,349 A | 1/1966 | Stalego | |
| 3,232,821 A | 2/1966 | Banks et al. | |
| 3,297,419 A | 1/1967 | Eyre, Jr. | |
| 3,513,001 A | 5/1970 | Woodhead et al. | |
| 3,551,365 A | 12/1970 | Matalon | |
| 3,784,408 A | 1/1974 | Jaffe et al. | |
| 3,791,807 A | 2/1974 | Etzel et al. | |
| 3,802,897 A | 4/1974 | Voigt et al. | |
| 3,809,664 A | 5/1974 | Burr et al. | |
| 3,826,767 A | 7/1974 | Hoover et al. | |
| 3,856,606 A | 12/1974 | Fan et al. | |
| 3,867,119 A | 2/1975 | Takeo et al. | |
| 3,907,724 A | 9/1975 | Higginbottom | |
| 3,911,048 A | 10/1975 | Vargiu et al. | |
| 3,919,134 A | 11/1975 | Higginbottom | |
| 3,922,466 A | 11/1975 | Bell et al. | |
| 3,955,031 A | 5/1976 | Jones et al. | |
| 3,956,204 A | 5/1976 | Higginbottom | |
| 3,961,081 A | 6/1976 | McKenzie | |
| 3,971,807 A | 7/1976 | Brack | |
| 4,014,726 A | 3/1977 | Fargo | |
| 4,028,290 A | 6/1977 | Reid | |
| 4,048,127 A | 9/1977 | Gibbons et al. | |
| 4,054,713 A | 10/1977 | Sakaguchi et al. | |
| 4,085,076 A | 4/1978 | Gibbons et al. | |
| 4,097,427 A | 6/1978 | Aitken et al. | |
| 4,107,379 A | 8/1978 | Stofko | |
| 4,109,057 A | 8/1978 | Nakamura et al. | |
| 4,144,027 A | 3/1979 | Habib | |
| 4,148,765 A | 4/1979 | Nelson | |
| 4,183,997 A | 1/1980 | Stofko | |
| 4,184,986 A | 1/1980 | Krasnobajew et al. | |
| 4,186,053 A | 1/1980 | Krasnobajew et al. | |
| 4,201,247 A | 5/1980 | Shannon | |
| 4,201,857 A | 5/1980 | Krasnobajew et al. | |
| 4,217,414 A | 8/1980 | Walon | |
| 4,233,432 A | 11/1980 | Curtis, Jr. | |
| 4,246,367 A | 1/1981 | Curtis, Jr. | |
| 4,259,190 A | 3/1981 | Fahey | |
| 4,265,963 A | 5/1981 | Matalon | |
| 4,278,573 A | 7/1981 | Tessler | |
| 4,296,173 A | 10/1981 | Fahey | |
| 4,301,310 A | 11/1981 | Wagner | |
| 4,310,585 A | 1/1982 | Shannon | |
| 4,322,523 A | 3/1982 | Wagner | |
| 4,330,443 A | 5/1982 | Rankin | |
| 4,333,484 A | 6/1982 | Keritsis | |
| 4,357,194 A | 11/1982 | Stofko | |
| 4,361,588 A | 11/1982 | Herz | |
| 4,379,101 A | 4/1983 | Smith | |
| 4,393,019 A | 7/1983 | Geimer | |
| 4,396,430 A | 8/1983 | Matalon | |
| 4,400,496 A | 8/1983 | Butler et al. | |
| 4,464,523 A | 8/1984 | Neigel et al. | |
| 4,506,684 A | 3/1985 | Keritsis | |
| 4,520,143 A | 5/1985 | Jellinek | |
| 4,524,164 A | 6/1985 | Viswanathan et al. | |
| 4,631,226 A | 12/1986 | Jellinek | |
| 4,654,259 A | 3/1987 | Stofko | |
| 4,668,716 A | 5/1987 | Pepe et al. | |
| 4,692,478 A | 9/1987 | Viswanathan et al. | |
| 4,714,727 A | 12/1987 | Hume, III | |
| 4,720,295 A | 1/1988 | Bronshtein | |
| 4,734,996 A | 4/1988 | Kim et al. | |
| 4,754,056 A | 6/1988 | Ansel et al. | |
| 4,761,184 A | 8/1988 | Markessini | |
| 4,780,339 A | 10/1988 | Lacourse et al. | |
| 4,828,643 A | 5/1989 | Newman et al. | |
| 4,845,162 A | 7/1989 | Schmitt et al. | |
| 4,906,237 A | 3/1990 | Johansson et al. | |
| 4,912,147 A | 3/1990 | Pfoehler et al. | |

(56) References Cited

U.S. PATENT DOCUMENTS

| | | |
|---|---|---|
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen et al. |
| 5,367,849 A | 11/1994 | Bullock |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Andersen et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |

(56) References Cited

U.S. PATENT DOCUMENTS

| | | | |
|---|---|---|---|
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B2 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |
| 6,719,862 B2 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1* | 8/2003 | Husemoen ............... C08K 9/10 525/329.7 |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |

(56) References Cited

U.S. PATENT DOCUMENTS

| | | |
|---|---|---|
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Hamed |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |
| 2009/0304919 A1 | 12/2009 | Wagner et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0256790 A1 | 10/2011 | Toas et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0133073 A1 | 5/2012 | Pacorel et al. |
| 2012/0156954 A1 | 6/2012 | Eckert et al. |
| 2013/0029150 A1 | 1/2013 | Appley et al. |
| 2013/0032749 A1 | 2/2013 | Jaffrennou et al. |
| 2013/0047888 A1 | 2/2013 | Mueller et al. |
| 2013/0059075 A1 | 3/2013 | Appley et al. |
| 2013/0082205 A1 | 4/2013 | Mueller et al. |
| 2013/0174758 A1 | 7/2013 | Mueller |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |
| 2014/0091247 A1 | 4/2014 | Jackson et al. |
| 2014/0134909 A1 | 5/2014 | Guo et al. |
| 2014/0357787 A1 | 12/2014 | Jobber et al. |

FOREIGN PATENT DOCUMENTS

| | | | |
|---|---|---|---|
| CA | 1090026 | 11/1980 | |
| CA | 2037214 | 9/1991 | |
| CA | 2232334 | 11/1998 | |
| CA | 2458333 | 12/1999 | |
| CA | 2278946 | 1/2000 | |
| CA | 2470783 | 12/2004 | |
| CN | 1251738 | 5/2000 | |
| DE | 1905054 | 8/1969 | |
| DE | 4142261 | 6/1993 | |
| DE | 4233622 | 4/1994 | |
| DE | 4308089 | 9/1994 | |
| DE | 102004033561 | 9/2005 | |
| DE | 102005023431 | 11/2006 | |
| EP | 0044614 A2 | 1/1982 | |
| EP | 0044614 A2 * | 1/1982 | ............ C03C 25/25 |
| EP | 0099801 | 2/1984 | |
| EP | 354023 | 2/1990 | |
| EP | 0461995 | 12/1991 | |
| EP | 0524518 A2 | 1/1993 | |
| EP | 0547819 A2 | 6/1993 | |
| EP | 0583086 A1 | 2/1994 | |
| EP | 0714754 A2 | 6/1996 | |
| EP | 796681 | 9/1997 | |
| EP | 0826710 A2 | 3/1998 | |
| EP | 856494 | 8/1998 | |
| EP | 0873976 A1 | 10/1998 | |
| EP | 878135 | 11/1998 | |
| EP | 0882756 A2 | 12/1998 | |
| EP | 0911361 A1 | 4/1999 | |
| EP | 915811 | 5/1999 | |
| EP | 936060 | 8/1999 | |
| EP | 976866 | 2/2000 | |
| EP | 0990729 A1 | 4/2000 | |
| EP | 1038433 A1 | 9/2000 | |
| EP | 1193288 A1 | 4/2002 | |
| EP | 1084167 | 9/2002 | |
| EP | 1268702 | 1/2003 | |
| EP | 1382642 | 1/2004 | |
| EP | 1486547 A2 | 12/2004 | |
| EP | 1522642 | 4/2005 | |
| EP | 1698598 A1 | 9/2006 | |
| EP | 1767566 | 4/2007 | |
| EP | 2223941 | 9/2010 | |
| EP | 2253663 | 11/2010 | |
| FR | 2614388 | 10/1988 | |
| GB | 770561 | 3/1957 | |
| GB | 809675 | 3/1959 | |
| GB | 926749 | 5/1963 | |
| GB | 1391172 | 4/1975 | |
| GB | 1469331 | 4/1977 | |
| GB | 1512066 | 5/1978 | |
| GB | 1525541 | 9/1978 | |
| GB | 2047258 | 11/1980 | |
| GB | 2078805 A | 1/1982 | |
| GB | 2173523 | 10/1986 | |
| GB | 2251438 | 7/1992 | |
| JP | 53113784 | 10/1978 | |
| JP | 57101100 | 6/1982 | |
| JP | 5811193 | 1/1983 | |
| JP | 61195647 | 8/1986 | |
| JP | 3-173680 | 7/1991 | |
| JP | 05186635 | 7/1993 | |
| JP | 7-034023 | 2/1995 | |
| JP | 09157627 | 6/1997 | |
| JP | 10234314 | 9/1998 | |
| JP | 11035491 | 2/1999 | |
| JP | 11181690 | 7/1999 | |
| JP | 2000327841 | 11/2000 | |
| JP | 2002293576 | 9/2002 | |
| JP | 2003147276 | 5/2003 | |
| JP | 2003238921 | 8/2003 | |
| JP | 2004060058 | 2/2004 | |
| JP | 2005306919 | 11/2005 | |
| NZ | 549563 | 1/2008 | |
| RU | 1765996 | 8/1995 | |
| SU | 374400 | 3/1973 | |
| WO | 1990007541 | 7/1990 | |

(56) References Cited

FOREIGN PATENT DOCUMENTS

| | | |
|---|---|---|
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

International Search Report and Written Opinion for PCT/US2008/069046, completed Sep. 25, 2008.

International Search Report and Written Opinion for PCT/EP2011/059317, completed Jul. 15, 2011.

International Search Report for PCT/EP2008/060185, completed Oct. 23, 2008.

International Search Report for PCT/EP2011/057363, completed Sep. 5, 2011.

Ames, J.M., "The Maillard Browning Reaction—an Update," Chemistry & Industry, No. 17, 1988, 4 pages.

"Gamma-aminopropyltrimethoxysilane,"Hawley's Condensed Chemical Dictionary, 14th Edition, John Wiley & Sons, Inc., 2002, 1 page.

Hodge, J.E., Chemistry of Browning Reactions in Model Systems, 1953, J. Agric. Food Chem., vol. 1, No. 15, pp. 928-943.

Agyei-Aye et al., "The Role of Anion in the Reaction of Reducing Sugars with Ammonium Salts," Carbohydrate Research 2002, 337: 2273-2277.

Laroque et al., "Kinetic study on the Maillard reaction. Consideration of sugar reactivity," Food Chemistry 2008, 111: 1032-1042.

Bjorksten et al., "Polyester Resin—Glass Fiber Laminates," Industrial and Engineering Chemistry (1954).

Dow Corning, "A Guide to Silane Solutions," 2005.

Knauf Data Sheet, 2006.

Molasses Corporation, United States Sugar Corporation, http://www.suga-lik.com/molasses/composition.html (Sep. 29, 2003).

Clamen, Guy, "Acrylic Thermosets: A Safe Alternative to Formaldehyde Resins," Nonwovens World, Apr.-May 2004, pp. 96-102.

Opposition to AU 2006272595, Amended Statement of Grounds and Particulars, issued from Australian Patent Office, Jul. 6, 2012, 22 pages.

Decision re Opposition to AU 2006272595, issued from Australian Patent Office, Aug. 14, 2015, 25 pages.

Opposition to EP 1732968, Notice of Opposition: Prior Art, Scope of the Patent, Reasons for the Opposition, issued from European Patent Office, Mar. 8, 2012, 18 pages.

Decision re Opposition to EP 1732968, issued from the European Patent Office, Nov. 14, 2014, 5 pages.

Opposition to EA 019802, submitted to Eurasian Patent Office on Dec. 26, 2014, 36 pages.

Decision re Opposition to EA 019802, issued by Eurasian Patent Office on Aug. 18, 2015, 15 pages.

Owens Corning Retiree Update: What Goes Around, Comes Around: A tale of Natural Binders, revised Mar. 20, 2013 p. 4.

A.P. Bryant, "The Terminology of Sugars," Industrial and Engineering Chemistry, vol. 26, No. 2, p. 231, Feb. 1934.

Food Flavor Chemistry, p. 162, Mar. 21, 2009 (English Abstract).

Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).

Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).

Residential Energy Conservation: vol. 1, Congress of the U.S., Office of Technology Assessment (Ed.), 357 pages (Jan. 1, 1979).

Office action for co-pending U.S. Appl. No. 12/524,502 (9 pages)—dated Sep. 21, 2012.

Office action for co-pending U.S. Appl. No. 12/524,502 (9 pages)—dated Apr. 4, 2013.

Office action for co-pending U.S. Appl. No. 12/524,512 (7 pages)—dated Aug. 6, 2012.

Office action for co-pending U.S. Appl. No. 12/524,512 (9 pages)—dated Apr. 1, 2013.

Office action for co-pending U.S. Appl. No. 12/524,512 (14 pages)—dated Nov. 12, 2014.

Office action for co-pending U.S. Appl. No. 12/524,512 (9 pages)—dated Jul. 10, 2015.

Office action for co-pending U.S. Appl. No. 12/524,512 (10 pages)—dated Mar. 23, 2016.

Office action for co-pending U.S. Appl. No. 12/524,512 (13 pages)—dated Oct. 5, 2016.

Office action for co-pending U.S. Appl. No. 12/524,512 (13 pages)—dated Apr. 6, 2018.

Office action for co-pending U.S. Appl. No. 12/524,512 (15 pages)—dated Jan. 17, 2019.

Office action for co-pending U.S. Appl. No. 12/524,469 (7 pages)—dated Jun. 7, 2012.

Office action for co-pending U.S. Appl. No. 12/524,469 (8 pages)—dated Jan. 29, 2013.

Office action for co-pending U.S. Appl. No. 12/524,469 (7 pages)—dated Aug. 20, 2013.

Office action for co-pending U.S. Appl. No. 12/524,469 (9 pages)—dated Jun. 9, 2014.

Office action for co-pending U.S. Appl. No. 12/524,469 (9 pages)—dated Oct. 17, 2014.

Office action for co-pending U.S. Appl. No. 12/524,469 (9 pages)—dated Jul. 23, 2015.

Office action for co-pending U.S. Appl. No. 12/524,539 (13 pages)—dated Jun. 21, 2012.

Office action for co-pending U.S. Appl. No. 12/524,539 (13 pages)—dated Jun. 6, 2013.

Office action for co-pending U.S. Appl. No. 12/524,539 (12 pages)—dated Dec. 17, 2014.

Office action for co-pending U.S. Appl. No. 12/524,539 (7 pages)—dated Jul. 15, 2015.

Office action for co-pending U.S. Appl. No. 12/524,539 (7 pages)—dated Mar. 23, 2016.

Office action for co-pending U.S. Appl. No. 12/524,539 (7 pages)—dated Dec. 29, 2016.

(56) References Cited

OTHER PUBLICATIONS

Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).

(56) References Cited

OTHER PUBLICATIONS

1st Petition for Inter Partes Review of U.S. Pat. No. D. 631,670 (68 pages, filed Jun. 19, 2015 by Petitioners Johns Manville Corporation and Johns Manville, Inc.).
2nd Petition for Inter Partes Review of U.S. Pat. No. D. 631,670 (62 pages, filed Nov. 2, 2015 by Petitioners Johns Manville Corporation and Johns Manville, Inc.).
Decision of PTAB regarding Institution of Inter Partes Review for U.S. Pat. No. D. 631,670 (33 pages)—Jan. 12, 2016.
Decision2 of PTAB regarding Institution of Inter Partes Review for U.S. Pat. No. D. 631,670 (27 pages)—May 9, 2016.
Final Written Decision of PTAB regarding Inter Partes Review of U.S. Pat. No. 631,670 based on 1st Petition (56 pages)—dated Jan. 11, 2017.
Final Written Decision of PTAB regarding Inter Partes Review of U.S. Pat. No. D. 631,670 based on 2nd Petition (55 pages)—dated May 8, 2017.
Court of Appeals for Federal Circuit Judgment from Appeal of PTAB Decisions in Inter Partes Reviews of U.S. Pat. No. D. 631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, August 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.
Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—dated Jul. 24, 2015.
Final Rejection in Ex Parte Reexamination of U.S. Pat. No. 7,772,347 (23 pages)—dated Jul. 24, 2015.
Final Rejection in Ex Parte Reexamination of U.S. Pat. No. 7,854,980 (31 pages)—dated Aug. 18, 2015.
Advisory Action in Ex Parte Reexamination of U.S. Pat. No. 7,888,445 (4 pages)—dated Oct. 6, 2015.
Advisory Action in Ex Parte Reexamination of U.S. Pat. No. 7,772,347 (4 pages)—dated Oct. 6, 2015.
Advisory Action in Ex Parte Reexamination of U.S. Pat. No. 7,854,980 (4 pages)—dated Nov. 18, 2015.
Examiner's Answer in Ex Parte Reexamination of U.S. Pat. No. 7,888,445 (8 pages)—dated Mar. 23, 2016.
Examiner's Answer in Ex Parte Reexamination of U.S. Pat. No. 7,772,347 (8 pages)—dated Mar. 23, 2016.
Examiner's Answer in Ex Parte Reexamination of U.S. Pat. No. 7,854,980 (8 pages)—dated Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—dated Dec. 7, 2018.
Notice of Intent to Issue Inter Partes Reexamination Certificate for U.S. Pat. No. 7,888,445 (14 pages)—dated Sep. 24, 2020.
Notice of Intent to Issue Inter Partes Reexamination Certificate for U.S. Pat. No. 7,772,347 (13 pages)—dated Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—dated Apr. 3, 2019.

(56) References Cited

OTHER PUBLICATIONS

Final Office Action from Reopened Prosecution in Ex Parte Reexamination of U.S. Pat. No. 7,854,980 (11 pages)—dated Aug. 8, 2019.
Notice of Intent to Issue Ex Parte Reexamination Certificate for U.S. Pat. No. 7,854,980 (3 pages)—dated Oct. 29, 2019.
Notice of Intent to Issue Inter Partes Reexamination Certificate for U.S. Pat. No. 7,807,771 (4 pages)—dated Jan. 30, 2014.
Notice of Intent to Issue Inter Partes Reexamination Certificate for U.S. Pat. No. 7,854,980 (6 pages)—dated Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—dated Oct. 17, 2016.
Examiner's Determination on Patent Owner Response/Requester Comments after Board Decision in Inter Partes Reexamination of U.S. Pat. No. 7,772,347 (17 pages)—dated Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—dated Sep. 8, 2017.
Final Decision of PTAB in Inter Partes Reexamination of U.S. Pat. No. 7,772,347 (24 pages)—dated Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—dated Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).
United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).

\* cited by examiner

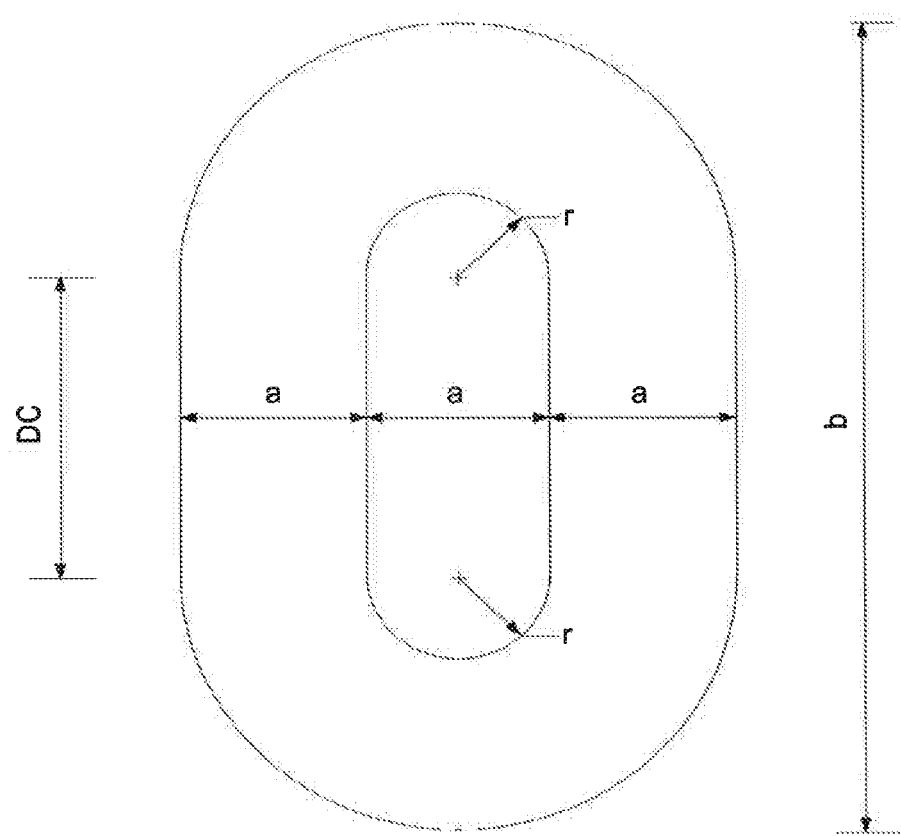

BINDERS

CROSS-REFERENCE TO RELATED APPLICATIONS

This application is a continuation of U.S. application Ser. No. 15/730,025, filed Oct. 11, 2017, which is a continuation of U.S. application Ser. No. 14/680,508, filed Apr. 7, 2015 (now abandoned), which is a continuation of U.S. application Ser. No. 14/026,394, filed Sep. 13, 2013 (now U.S. Pat. No. 9,039,827), which is a continuation of U.S. application Ser. No. 13/341,542, filed Dec. 30, 2011 (now U.S. Pat. No. 8,940,089), which is a divisional of U.S. application Ser. No. 12/599,858, filed Mar. 30, 2010 (now U.S. Pat. No. 8,114,210), which is a U.S. national counterpart application of International Application Serial No. PCT/EP2008/060185, filed Aug. 1, 2008 under 35 USC § 371, which claims priority to GB Patent Application Serial Number 0715100.4, filed Aug. 3, 2007, GB Patent Application Serial Number 0807777.8, filed Apr. 29, 2008, and GB Patent Application Serial Number 0810297.2, filed Jun. 6, 2008, the entire disclosures of each of which are hereby incorporated herein by reference.

TECHNICAL FIELD

This invention relates to binders, for example for glass wool or stone wool insulation.

BACKGROUND

WO 2007/014236 (incorporated herein by reference) relates to binders, including binders comprising Maillard reactants. One particular binder disclosed is based on a triammonium citrate-dextrose system derived from mixing dextrose monohydrate, anhydrous citric acid, water and aqueous ammonia. One of the many advantages of this binder system is that it is formaldehyde free.

SUMMARY

One aspect of the present invention provides a binder solution in accordance with claim 1; the dependent claims define alternative and/or preferred embodiments.

In another aspect, the present invention provides a binder solution comprising a solution obtainable by dissolving
  a carbohydrate,
  an acid precursor derivable form an inorganic salt,
  a source of nitrogen
  optionally an organic acid or a precursor thereof and
  optionally ammonia.

Binder solutions used in accordance with the present invention may be "substantially formaldehyde free", that is to say that they liberate less than 5 ppm formaldehyde as a result of drying and/or curing (or appropriate tests simulating drying and/or curing). Such binder solutions are preferably "formaldehyde free", that is the say they liberate less than 1 ppm formaldehyde in such conditions.

Products in accordance with the invention which incorporate binders (for example insulation materials or wood boards) may be "substantially formaldehyde free", that is to say that they comprise less than 5 ppm or less than detectable limits of free formaldehyde and/or consist of materials which together comprise less than these amounts of free formaldehyde and/or release levels of formaldehyde in standardised tests adapted to simulate their ordinary use which allows them to be classified as having no or undetectable levels of formaldehyde release. Preferably, such products release less than 10 µg/m³, more preferably less than 5 µg/m³ of formaldehyde during the period of 24-48 hours from the start of testing in accordance with ISO 16000.

BRIEF DESCRIPTION OF THE DRAWINGS

FIG. 1 shows a plan view of a mineral fibre test sample, where r is radius=12.7 mm, DC is distance between centers=44.5 mm, a=25.4 mm, and b=121 mm.

DETAILED DESCRIPTION

It has been found that binders according to the present invention may have at least equivalent and indeed improved properties compared to, for example, the tri-ammonium citrate-dextrose system of WO 2007/014236. WO 2007/014236 teaches binder systems based, inter alia, on a combination of a carbohydrate (for example a reducing sugar), ammonia and a carboxylic acid and suggests that a Maillard type reaction may form the basis of the curing chemistry. It would have been thought that the nature of the acid used would have a significant effect upon the properties of the cured binder, particularly if the acid precursor and/or a derivative therefrom is incorporated into the structure of the cured binder. It is thus surprising that an acid precursor derivable from an inorganic salt should provide a suitable acid precursor in an otherwise apparently similar binder system.

Use of an acid precursor derivable from an inorganic salt may have significant advantages in terms of cost, availability and ease of handling. The acid precursor derivable from an inorganic salt of the binder solution may comprise a species selected from the group consisting of sulphates, phosphates, nitrates and carbonates. A particular advantage can be achieved by use of one or more inorganic ammonium salts, for example, an ammonium sulphate, an ammonium phosphate or an ammonium carbonate. An ammonium salt may provide the or part of the acid precursor and/or the or part of the source of nitrogen and/or the or part of a pH control system. An ammonium nitrate may also work; however, ammonium nitrate may oxidise aldehyde groups of the carbohydrate (for example in the case of dextrose) and/or require precautions to avoid explosions.

An ammonium sulphate is particularly advantageous but ammonium phosphate may be used in addition to or instead of this. Ammonium phosphate may be mono ammonium phosphate, di ammonium phosphate or tri ammonium phosphate; it may be an ammonium hydrogen phosphate. An ammonium carbonate, alone or in combination with the other materials disclosed herein, may also provide good results. The ammonium carbonate may be an ammonium bicarbonate.

The acid precursor, particularly when this consists essentially of inorganic ammonium salt(s), may make up
  at least 5%, preferably at least 7%, more preferably at least 9% by dry weight of the uncured binder solution; and/or
  less than 25% or 20%, preferably less than 18%, more preferably less than 16% by dry weight of the uncured binder solution.

The term "consist or consisting essentially of" is intended to limit the scope of a claim to the specified materials or steps and those that do not materially affect the basic and novel characteristic(s) of the claimed invention.

The acid may comprise: a sulphuric acid, a phosphoric acid, a nitric acid or a weak acid.

The binder may comprise between 5% and 25%, preferably 10% to 20%, more preferably 15% to 20% by dry weight of acid precursor (particularly where this is an inorganic ammonium salt) to carbohydrate (particularly when this is a sugar).

Where the binder comprises both an acid precursor derivable from an inorganic salt and an organic acid, these may be present in the following amounts by dry weight with respect to the carbohydrate (particularly where this is a sugar):

|  | Preferred | More preferred | Most preferred |
|---|---|---|---|
| acid precursor derivable from an inorganic salt | At least 2.5% | At least 5% |  |
| organic acid | At least 2.5% | At least 5% |  |
| Combination of organic acid and acid precursor derivable from an inorganic salt | 5-25% | 10-20% | 15-20% |

Where an organic acid is used, this is preferably derived from an ammonium salt. For example, an ammonium citrate, particularly tri-ammonium citrate may be used as a source of citric acid.

Prior art phenol formaldehyde binder systems for mineral wool insulation have been used with the addition of about 2% by weight ammonium sulphate as a curing agent. However, the chemistry of such phenol formaldehyde binder systems is not comparable to the binder systems of the present invention which are not based on phenol and/or formaldehyde and/or on other phenolics.

A carbohydrate may be used in the binder solution rather than specifically a reducing sugar and may comprise a monosaccharide, for example in its aldose or ketose form. Preferably, the carbohydrate comprises a sugar, more preferably a reducing sugar or a reactant that yields a reducing sugar in situ under thermal curing condition; it may comprise glucose (ie dextrose). The carbohydrate may comprise a carbohydrate having a reducing aldehyde. It is believed that the use of a reducing sugar and particularly dextrose gives good binder strengths, particularly for the manufacture of mineral wool insulation products. The dextrose need not be 100% pure but use of a material having a dextrose equivalent value of at least 0.85, preferably at least 0.9 and more preferably at least 0.95 is thought to be advantageous. The dextrose equivalent value DE can be thought of as i) a measure of de-polymerization and is roughly: DE=100/dp where dp stands for degree of polymerization or ii) the total amount of reducing sugars calculated as D-glucose (dextrose) on a dry basis.

Preferably, the binder solution and/or the binder is free or substantially free of starch; the presence of substantial quantities of starch is thought to increase the curing time and/or reduce the strength of the cured binder. The binder solution and/or the binder may be free or substantially free of proteins.

Industrial, non-food grade dextrose may be used as the reducing sugar; products such as Sirodex331 which is a 75% solids sugar solution obtainable from Tate and Lyle with a DE value of 94.5 may be used.

The reducing sugar may consist essentially of dextrose. Particularly in this case and more particularly where, in addition, the acid precursor consists essentially of an ammonium salt, for example an ammonium sulphate, the ratio by dry weight of the amount of reducing sugar/the amount of acid precursor may be greater than or equal to 2.5 and/or less than or equal to 13.

The source of nitrogen may be an amine or an amine reactant; it may be derivable from the same source as the acid precursor, for example, from an inorganic ammonium salt. It is preferably ammonia in solution.

Precursors for and/or reactants which give the materials referred to may be used.

In one embodiment, the binder is derived essentially from a reducing sugar and an inorganic ammonium salt in aqueous solution.

In another embodiment, the binder may also comprise an organic acid, particularly a carboxylic acid; this may be a polycarboxylic acid, particularly a bi-carboxylic acid or tri-carboxylic acid, preferably citric acid; it is preferably monomeric. The combination of an organic acid (or a precursor a salt or an anhydride thereof) with an acid precursor derivable from an inorganic salt may present various advantages. Firstly, such a combination may reduce the risk of punking (which has been observed with such binders based solely on organic acids) whilst providing acceptable strength. Punking is a term of art in the mineral fibre insulation area which generally denotes a comparatively rapid oxidation of a binder with a concomitant generation of heat in a finished and generally packaged insulation product. Punking generally causes generation of fumes and discolouring of the insulation material. It may be associated with exothermic reactions which increase the temperatures through the thickness of the insulation material; this may destroy the integrity of the insulation product and/or present a fire hazard.

Alternatively or additionally, the combination of an organic acid (or a precursor, a salt or an anhydride thereof) with an acid precursor derivable from an inorganic salt may moderate acid conditions occurring during curing and thus reduce the risk or tendency of such conditions to cause significant damage to the material being bound. Such a combination may be particularly advantageous as a binder for stone wool insulation whose fibres may be more susceptible to potential damage by acid than, for example, glass wool insulation.

In a further embodiment, the binder is derived essentially from: a carbohydrate; an inorganic ammonium salt; and an organic acid and/or organic acid precursor; in aqueous solution.

Binders which comprise or consist essentially of the components described herein may include additives, for example, additives selected from: silanes, mineral oils, coupling agents, silicones or siloxanes (particularly for water repellency), silicon containing compounds, surfactants, hydrophilic additives, hydrophobic additives, waxes, substances useful for controlling the pH (e.g. ammonium hydroxide) and ammonia. Ammonium hydroxide when used, and indeed other additives, may provide the and/or an additional source of nitrogen.

Preferably, the total quantity of additives (excluding ammonia) is less than 5% by weight (excluding the weight of water present), more preferably less than 3% or less than 2% by weight.

Particularly for mineral fibre products, it is preferred to include a silane as an additive. The binder and/or binder solution may comprise at least 0.1% and/or less than 1% of a silane by dry weight. The silane may be amino substituted; it may be a silyl ether and it is believed that its presence may significantly improve the long term strength of the binder, particularly after weathering.

Preferences for the pH of the binder are:

|  | Preferred | More preferred | Most preferred |
|---|---|---|---|
| pH of binder | ≥7 | ≥8 | ≥9 | at least in the state in which the binder is applied to a material to be bound and/or recovered in a waste water recuperation system. Such a neutral or alkaline pH of the binder may alleviate problems of corrosion of manufacturing equipment which have been encountered with some essentially acidic prior art binder systems. Such prior art binders include binders consisting essentially of polyacrylic acids or polymer polycarboxylic acids. One particular advantage of the present invention is thus the use of a binder system that can operate in such neutral or alkaline conditions. When cured, the binder may become acidic during the curing process. However, equipment corrosion considerations are less significant in this case due to the minimal contact between the manufacturing equipment and the binder when in this state. The pH of the binder may be less than or equal to 13, preferably less than or equal to 12, 11 or 10.

A preferred pH may be in the range of 7.5 to 9.5, particularly 8 to 9. Binder which has been applied to the material to be bound and is subsequently dissolved in water may have a pH of greater than 6.

It is preferred to arrange the pH of the binder solution at an appropriate level to prevent precipitation of its constituents and particularly to ensure that the acid precursor derivable from an inorganic salt remains in solution. This is particularly the case where ammonium phosphate provides the acid precursor. Better dry and/or weathered strengths and/or more homogeneous products may be achieved by using homogeneous binder solutions comprising ammonium salt acid precursors which are free from precipitates, particularly when ammonium phosphate is used and the binder solution is free from phosphate precipitates.

The binder composition may be provided in the form of an aqueous solution; it may contain free ammonia or excess ammonia in solution. A neutral or alkaline pH of the binder may be generated by an excess of alkaline groups compared with acid groups present in the binder solution, for example, due partially or substantially to the presence of ammonia in the solution. Additional ammonia may be added to the binder solution, for example 0.2%-1% by weight, or indeed more; this may help to keep a wash water system alkaline over the long term, particularly for the manufacture of mineral wool insulation.

In the case or mineral wool fibres particularly for thermal insulation products, when binder solution is sprayed on to hot mineral wool fibres just after they have been formed, the residual heat of the mineral wool fibres may cause a significant portion of any water in the binder solution to evaporate. Consequently, the mineral wool fibres which are then collected to form a batt may have binder present on them in the form of a sticky, viscous or tacky liquid. This may facilitate bonding between individual fibres via the binder.

One of the many advantages of this binder system is that it is applied, for example sprayed onto mineral wool fibers, in a substantially unreacted state. The ability to apply the binder solution in a substantially unreacted state may alleviate problems associated with pre-reacting the binder components in solution which have been encountered with some prior art binder systems in which the components are pre-reacted. Such prior art binders include binders consisting essentially of pre-reacted polymers or resins which are applied to the materials to be bound. With substantially unreacted binder present in the form of a sticky, viscous or tacky liquid on the material to be bound, the reaction between the binder components may occur in a substantially dry state. One may describe the reaction as a bulk polymerization because it is occurring without the benefit of a solvent. A particular advantage of the present invention is thus the use of a binder system that can polymerise in a substantially dry state or through a bulk polymerisation.

Mineral fibres used in the context of the invention may be formed by internal or external spinning. They may have a temperature in the range 20° C. to 200° C., generally 30° C. to 100° C. or 150° C., when sprayed with the binder solution. The quantity of binder solution sprayed may be used with or without additional water sprays to assist in cooling the mineral fibres to a desired temperature between their formation and their collection to form a batt.

A particular advantage of using ammonia in solution to control the pH of the binder solution applied to the mineral fibres is that at least part of the ammonia of binder solution that sticks to the fibres may flash off due to the residual heat of the mineral wool fibres. Consequently, the binder solution that coats the fibres may have a lower pH than the binder solution sprayed.

The invention extends to a method of manufacturing a mineral fibre thermal insulation product comprising the sequential steps of:

Forming mineral fibres from a molten mineral mixture;
spraying a substantially formaldehyde free binder solution on to the mineral fibres, the binder solution comprising: a carbohydrate (particularly a reducing sugar), an acid precursor derivable from an inorganic salt and a source of nitrogen;
Collecting the mineral fibres to which the binder solution has been applied to form a batt of mineral fibres; and
Curing the batt comprising the mineral fibres and the binder by passing the batt through a curing oven so as to provide a batt of mineral fibres held together by a substantially water insoluble cured binder.

Wash water may be sprayed on to mineral fibres between their formation and their collection to form a batt, at least a part of the wash water having been sprayed on mineral fibres and subsequently returned to a wash water system to be reused as wash water. The binder solution may comprise wash water.

The binder may be curable; it may be cured, for example in a curing oven; it may form a thermoset binder. In its cured form, the binder may: comprise melanoidins; and/or be thermoset; and/or be water insoluble or substantially water insoluble. The binder solution may be substantially colourless or white to off-white; upon curing, the binder may take on a dark colour, particularly a dark brown colour. The cured product may be dark in colour, particularly dark brown in colour. The binder may be free of proteins; it may be free of cellulosic feedstock. One of the many advantages of this binder system is that the extent of curing can be determined by the colour. Substantially dehydrated binder appears white or off-white. Progressively cured to a greater extent, the binder appears progressively darker in colour (a darker shade of brown). When applied to mineral fibers, the extent to which the mineral wool insulation has cured can be determined by its colour.

When applied to the material to be bound and/or prior to curing, the binder may be free or substantially free of melanoidins and/or other reaction products derived from curing. Curing of the binder may produce glucosylamine, particularly as an intermediate product. Consequently, a cured or particularly a partially cured product may comprise glucosylamine.

The reaction of the binder upon curing may be essentially a Maillard type reaction as described for example in US Patent Application 20070027283 or WO2007/14236. The binder may comprise polymerisation products of a mixture that comprises a reducing sugar and a material selected from the group consisting of ammonium sulphate, ammonium phosphate, ammonium nitrate and ammonium carbonate.

The binder solution may be formulated by combining:
A carbohydrate, preferably a reducing sugar;
An acid precursor derivable from an inorganic salt, preferably an ammonium sulphate or ammonium phosphate;
A source of nitrogen; and
water.

The formulation may comprise optional or additional ammonia provided in the form of an aqueous ammonia solution. The water may comprise wash water or recycled process water.

Forming the binder solution from a carbohydrate and an acid precursor comprising an inorganic ammonium salt provides one particular advantageous preparation method. This may be achieved in a simple mixing chamber which may be open and/or at atmospheric pressure. The carbohydrate and/or the acid precursor may be added in powder or liquid form. The preparation is preferably carried out at room temperature. Preferably it is not necessary to supply heat to prepare the binder solution; nevertheless, the binder solution may be heated during its preparation, for example to a temperature with the range 20° C. to 80° C., particularly where this facilitates dissolving and/or mixing of its ingredients.

The binder solution, particularly in the state applied to the material to be bound, may comprise:
at least 5% 10%, 15% or 18% solids and/or
less than 70% or 60% (particularly in the case of wood board applications) or less than 50%, 40% or 20% solids (particularly in the case of mineral fibre insulation applications)
particularly determined as bake out solids by weight after drying at 140° C. for 2 hours.

The collection of loose matter bound together by means of the binder solution may comprise materials selected from: fibres, fibrous materials, mineral fibres, glass fibres, stone wool fibres, cellulosic fibres (including wood fibres, wood shavings, wood particles and sawdust), wood veneers, facings, wood facings, particles, woven or non-woven materials, loosely assembled materials, woven or non-woven materials.

The binder solution and/or the binder are preferably organic.

The loose matter may be shaped and/or dimensioned and/or moulded with the aid of the binder. The material produced may be selected from: a thermal insulation material, a mineral fibre product, a wood board product (including chip board, orientated strand board, particle board, medium density fibre board, wood facing products), foundry sands.

The matter to be bound may be at a temperature in the range 20° C. to 100° C. when the binder is applied. Particularly in the case of wood boards products, the binder and the loose matter may be mechanically mixed, for example by tumbling.

The binder solution, particularly when applied to the loose matter, may have a viscosity appropriate for application by spraying or pouring. Its viscosity at 20° C. may be:
Less than about 1.5 Pa·s, preferably less than about $1 \times 10^{-2}$ Pa·s; and/or
Greater that about $2 \times 10^{-4}$ Pa·s, preferably greater than about $5 \times 10^{-4}$ Pa·s Curing of the binder may occur in a curing oven, for example using forced hot air circulation; it may occur in a press. Curing may comprise a dehydration of the binder; it may comprise a polymerisation; it may comprise a bulk polymerisation reaction. Curing may be carried out for duration of 20 minutes or less, preferably 10 minutes or less; it may be carried out by passing the product (for example a mineral fibre batt) through at least one zone of a curing oven at a temperature within the range 230° C.-300° C. with an oven residence time in the range 30 seconds to 20 minutes. Curing of the binder preferably occurs when the binder solution (from which water may have been evaporated) is in contact with the loose matter; it may occur at substantially atmospheric pressure. The curing may be a substantially dry curing, that is to say by application of dry heat and/or substantially dry or heated atmospheric air rather than using steam or heated water vapour.

Particularly in the case of mineral fibre insulation products, the curing temperature and time may be selected as a function of the product density and/or thickness. The curing oven in such cases may have a plurality of heating zones having temperatures within the range 200° C. to 350° C. (typically 230° C. to 300° C.). A thin, low density product (12 kg/m³ or less) may be cured by passing through the curing oven in as little as 20 seconds; a thick, high density product (80 kg/m³ or more) may require a passage of 15 minutes or more in the curing oven. The product may reach a temperature in the range 180° C.-220° C. during the curing process.

The cured binder may comprise greater than 2% and/or less than 8% nitrogen by mass as determined by elemental analysis.

The binder in its uncured state may comprise the following levels of sulphates, phosphates carbonates and/or nitrates by dry weight:
Greater than 2.5%, 3% or 5%; and/or
Less than 25%, 22%, or 20%

Finished materials manufactured using binder systems according to the present invention may have residual levels of sulphates, phosphates, carbonates and/or nitrates derived notably from the inorganic salt serving as the acid precursor. Such species may be present in the following quantities:
Greater than 500, 750, 1000 or 1500 mg/kg; and/or
Less than 5000, 4000 or 3000 mg/kg.

The presence of such species may be assessed in a leach test and provide an indication in the final product of the binder system used.

The quantity of binder in the finished product, particularly in the case of mineral wool insulation, may be:
Greater than: 1%, 2%, 2.5%, 3%, 3.5% or 4%; and/or
Less than: 20%, 15%, 10% or 8%
measured by dry weight of the finished product.

Particularly in the case of mineral fibre insulation, the products may have one or more of the following parting strengths:
Ordinary Parting Strength of
At least 120 g/g, preferably at least 150 g/g; and/or
Less than 400 g/g
Weathered Parting Strength of
At least 120 g/g, preferably at least 150 g/g; and/or Less than 400 g/g % loss between Ordinary and Weathered Parting Strength of Less than 10%, preferably less than 5%

Where the product is mineral wool insulation may have one or more of the following characteristics:

A density greater than 5, 8 or 10 kg/m$^3$;

A density less than 200, 180 or 150 km/m$^3$

Comprise glass wool fibres and have a density greater than 5, 8 or 10 kg/m$^3$ and/or less than 80, 60 or 50 kg/m$^3$;

Comprise stone wool fibres and have a density greater than 15, 20 or 25 kg/m$^3$ and/or less than 220, 200 or 180 kg/m$^3$;

A thermal conductivity λ of less than 0.05 W/mK and/or greater than 0.02 W/mK

Comprise less than 99% by weight and/or more than 80% by weight mineral fibres.

A thickness of greater than 10 mm, 15 mm or 20 mm and/or less than 400 mm, 350 mm or 300 mm.

Where the product is wood board product, it may have one or more of the following characteristics:

Dimensions of at least 50 cm×80 cm, preferably at least 1 m×2 m

Thickness of at least 11 mm, 12 mm or 15 mm

A curing time of less than 25, 15, 12 or 10 minutes

An internal bond strength measured in accordance with EN319 of at least: 0.4 N/mm$^2$ or 0.45 N/mm$^2$ (particularly for particle board or fibre boards) or measured in accordance with EN300 of at least 0.28 N/mm$^2$ (particularly for orientated strand board)

A thickness swelling after 24 hours in water at 20° C. according to EN317 of less than 12%, preferably less than 10%

A water absorption after 24 hours in water at 20° C. of less than 40%, preferably less than 30%

A modulus of elasticity according to EN310 of at least: 1800 N/mm$^2$ (particularly for particle board or fibre boards) or 2500 N/mm$^2$ (particularly for orientated strand board) or 3500 N/mm$^2$ or 4800 N/mm$^2$ A bending strength (MOR) of at least: 14 N/m$^2$ (particularly for particle board or fibre boards) or 18 N/mm$^2$ (particularly for orientated strand board) or 20 N/mm$^2$ or 28 N/mm$^2$ Wax as an additive, for example in the range 0.1 to 2% by weight, preferably 0.5 to 1% by weight A resin content (weight of dry resin to weight of dry wood particles) in the range 8 to 18% by weight, preferably 10 to 16% by weight, more preferably 12 to 14% by weight.

Be cured in a press, particularly between platens have a temperature of greater than 180° C. or 200° C. and/or less than 280° C. or 260° C.

Embodiments of the invention will now be described by way of example with reference to FIG. 1 which is a plan view of a mineral fibre test sample.

Shell Bone Testing:

Binders were prepared as aqueous solutions by combining the ingredients of a desired binder formulation in an open, unheated reaction vessel adding distilled water subsequently adding a silane solution agitating during addition of liquids and afterwards for several minutes to achieve complete dissolution of solids such that the binder solution contained approximately 45% dissolved solids as a percentage of total weight of solution. A 2-g sample of this solution, upon thermal curing at about 200° C. to 210° C. for 8 minutes, would yield 30% solids (the weight loss being attributed to dehydration during thermoset binder formation).

An evaluation of dry and "weathered" tensile strength of glass bead-containing shell bones provided an indication of the likely tensile strength and the likely durability of fibreglass insulation or other materials prepared with that particular binder. Predicted durability is based on the ratio of a shell bone's weathered tensile strength to its dry tensile strength.

To prepare the shell bones, an electric mixer was used for about two minutes to mix approximately 75 g of binder with 727.5 g of glass beads (equivalent to Quality Ballotini Impact Beads, Spec. AD, US Sieve 70-140, 106-212 micron-#7, from Potters Industries, Inc.). Any clumps from the sides of the mixer whisk and from the sides and bottom of the mixing bowl were mixed in manually using a spatula about half way through the mixing and also at the end of the mixing.

The prepared glass beads/binder mixture was added to the mould cavities of a shell bone mould (Dietert Foundry Testing Equipment; Heated Shell Curing Accessory, Model 366) which had been pre-heated to about 218° C. (425° F.). The surface of the mixture in each cavity was flattened out, while scraping off the excess mixture to give a uniform surface area to the shell bone. Any inconsistencies or gaps that existed in any of the cavities were filled in with additional glass beads/binder mixture and then flattened out. The top platen was quickly placed onto the bottom platen (to avoid producing shell bones with two differentially cured layers). The cured shell bones were removed after seven minutes, cooled to room temperature on a wire rack, labelled and placed individually in plastic storage bags. If shell bones could not be tested on the day they were prepared, the shell bone-containing plastic bags were placed in a dessicator unit. During curing the temperature of the bottom platen ranged from about 204° C. to about 221° C. (about 400° F. to about 430° F.), while the temperature of the top platen ranged from about 227° C. to about 243° C. (about 440° F. to about 470° F.).

Procedure for Testing Breaking Strength:

Equipment: 5500 R Instron machine

Immediately prior to testing, each shell bone was removed from is plastic bag and its weight and thickness recorded.

Weathering Procedure for Shell Bones:

16 hours weathering in a pre-heated humidity chamber (65° C., 95% relative humidity)

upon removal shell bones were sealed in individual plastic storage bags and taken immediately for testing.

Procedure for Measuring Gel Time:

A small amount of binder (2.0 ml) is added to the centre of a hot plate set to 150° C. and a stop watch is started. The binder is worked with a spatula until it is possible to draw the sample into a long string. The time taken from the addition of the binder to the string formation is the gel time.

Binder Formulations Tested—Inorganic Acid Precursors Compared with Citric Acid:

| Test ref: | Binder formulation (by dry weight) |
|---|---|
| A | 85% DMH + 15% CA + 4.8% NH4OH + 0.3% ISI0200 |
| B | 90% DMH + 10% AmSO4 + 4.8% NH4OH + 0.3% ISI0200 |
| C | 85% DMH + 15% AmSO4 + 4.8% NH4OH + 0.3% ISI0200 |
| D | 80% DMH + 20% AmSO4 + 4.8% NH4OH + 0.3% ISI0200 |

-continued

| Test ref: | Binder formulation (by dry weight) |
|---|---|
| E | 90% DMH + 10% AmPO4 + 4.8% NH4OH + 0.3% ISI0200 |
| F | 85% DMH + 15% AmPO4 + 4.8% NH4OH + 0.3% ISI0200 |
| G | 80% DMH + 20% AmPO4 + 4.8% NH4OH + 0.3% ISI0200 |

Binder Formulations Tested—Combined Inorganic Acid Precursor and Citric Acid Compared with Citric Acid Alone and Inorganic Acid Precursor Alone:

| Test ref: | Binder formulation (by dry weight) |
|---|---|
| H | 85% DMH + 15% CA + 4.8% NH4OH + 0.3% ISI0200 |
| I | 85% DMH + 10% CA + 5% AmSO4 + 4.8% NH4OH + 0.3% ISI0200 |
| J | 85% DMH + 5% CA + 10% AmSO4 + 4.8% NH4OH + 0.3% ISI0200 |
| K | 85% DMH + 15% AmSO4 + 4.8% NH4OH + 0.3% ISI0200 |

Key:
DMH=Dextrose monohydrate
CA=citric acid
NH4OH=ammonium hydroxide
ISIO0200=silane
AmSO4=ammonium sulphate
AmPO4=ammonium phosphate Test Results—Inorganic Acid Precursors Compared with Citric Acid:

| Test ref | Dry breaking strength (MN/m$^2$) | Weathered breaking strength (MN/m$^2$) | Loss in breaking strength from weathering/% | Gel time of binder solution (s) | pH of binder solution just before mixing with beads |
|---|---|---|---|---|---|
| A | 1.455 | 1.567 | -7.70 | 343 | 9.54 |
| B | 1.271 | 0.895 | 29.57 | 280 | 10.28 |
| C | 1.550 | 0.856 | 44.79 | 362 | 10.24 |
| D | 1.877 | 1.156 | 38.39 | 327 | 10.13 |
| E | 1.499 | 1.069 | 28.68 | 356 | 10.18 |
| F | 1.281 | 0.848 | 33.82 | 334 | 9.99 |
| G | 1.123 | 0.801 | 28.74 | 287 | 9.73 |

Test Results—Combined Inorganic Acid Precursor and Citric Acid Compared with Citric Acid Alone and Inorganic Acid Precursor Alone:

| Test ref | Dry breaking strength (MN/m$^2$) | Weathered breaking strength (MN/m$^2$) | Loss in breaking strength from weathering/% | Gel time of binder solution (s) | pH of binder solution just before mixing with beads |
|---|---|---|---|---|---|
| H | 1.69 | 1.50 | 11.32 | 363 | 9.39 |
| I | 1.50 | 1.18 | 21.37 | 341 | 9.71 |
| J | 1.21 | 1.05 | 13.19 | 375 | 9.99 |
| K | 1.47 | 1.02 | 30.33 | 376 | 9.97 |

Results from tests carried out together (test A to G were carried out in one session and tests H to K carried out during another session) provide a useful indication of results relative to other results obtained during the same test session. It may not be reliable to compare tests results from different test sessions.

First Comparative Testing on Insulation Product:
Comparative testing of binder systems on a mineral fibre insulation product gave the following results:

| Binder tested | Description | Formulation |
|---|---|---|
| PF1 | Comparative example - standard phenol formaldehyde binder | Resin, Urea, Lignin, Ammonia, Silane |
| AC1 | Comparative example - ammonium citrate based binder | Dextrose 85% Citric Acid 15% Ammonia 4.8% Silane 0.3% |
| Ex1 | Example 1 of the present invention | Dextrose 85% Ammonium Sulphate 15% Ammonia 4.8% Silane 0.3% |

| Product used for test: | glass wool fibre insulation product, nominal density 16 kg/m$^3$, nominal thickness 75 mm, nominal width 455 mm |
|---|---|

Binder Content of Test Product LOI (Loss on Ignition) % Weight:

| Binder | Mean LOI |
|---|---|
| PF1 | 6.22% |
| AC1 | 6.91% |
| Ex1 | 6.78% |

Drape Test (Mean Average in Mm Measured after the Periods Specified):

| Binder | Day 1 | Week 1 | Week 3 | Week 6 |
|---|---|---|---|---|
| PF1 | 55 | 68 | 60 | 71 |
| AC1 | 83 | 99 | 80 | 72 |
| Ex1 | 66 | 76 | 66 | 75 |

Thickness (Mean Average in Mm Measured after the Periods Specified in Accordance with British Standard BS EN 823:1995

| Binder | Day 1 | Week 1 | Week 3 | Week 6 |
|---|---|---|---|---|
| PF1 | 76.4 | 75.1 | 75.1 | 75.2 |
| AC1 | 75.3 | 73.6 | 72.5 | 74 |
| Ex1 | 76 | 76.7 | 74.9 | 74.3 |

Density (Mean Average in Kg/m Measured after the Periods Specified)

| Binder | Day 1 | Week 1 | Week 3 | Week 6 |
|---|---|---|---|---|
| PF1 | 16.44 | 16.7 | 16.35 | 16.44 |
| AC1 | 16.68 | 16.41 | 16.33 | 16.48 |
| Ex1 | 16.5 | 16.9 | 16.5 | 16.5 |

Quantity of Sulphates Present Mg/Kg

| Binder | Sample 1 | Sample 2 |
|---|---|---|
| AC1 | 240 | 240 |
| Ex1 | 2000 | 2200 |

Parting Strength (g/g)

| Binder | Ordinary | Weathered | % loss |
|--------|----------|-----------|--------|
| PF1    | 248      | 107       | 56.85  |
| AC1    | 230      | 199       | 13.47  |
| Ex1    | 196      | 189       | 3.57   |

Test Procedures:
Binder Content LOI (Loss on Ignition)

A weighed sample of wool plus binder is placed in a muffle furnace set to 550° C. After a set time the wool is removed from the furnace, placed in a desiccator to cool and re-weighed. The weight loss is expressed as a percentage of the original sample weight and is known as the binder content or Loss On Ignition (LOI).

Drape Test

A single batt (or slab) is placed across two poles (each 500 mm long, 20 mm diameter) set into a wall 1 metre apart. The degree of sag in the centre of the batt is recorded. This is repeated for all of the batts in a pack and for several packs. Packs are measured at set points over a period of time to determine the long term effects of compression on the batts.

Density: measured for the samples subjected to the drape test

Quantity of sulphates present: leaching test for granular wastes in water with eluate analysis according to British standard BS EN 12457-2 at L/S10

Parting Strength

The parting strength is expressed in grams/gram being the total breaking load of six test specimens divided by their total weight.

The test is carried out on mineral fibre mats as received for testing (Ordinary Parting Strength) and after an accelerated weathering test as explained below (Weathered Parting Strength).

A first set of six samples of the form and dimensions shown in FIG. 1 are cut from the mineral fibre mat to be tested. The dimensions are:
r: radius 12.7 mm;
DC: distance between centres 44.5 mm;
a: 25.4 mm;
b: 121 mm.

The long axis of the samples should be parallel to the conveyor direction and the samples should be taken across the full width of the mineral mat. A second set of six samples is then taken in the same way.

The total weight of the first group of six samples W1 in grams is recorded.

The total weight of the second group of six samples W2 in grams is recorded; these samples are then placed in a preheated autoclave and conditioned on a wire mesh shelf away from the bottom of the chamber under wet steam at 35 kN/m² for one hour. They are then removed, dried in an oven at 100° C. for five minutes and tested immediately for parting strength.

To test the parting strength, each sample is mounted in turn on the jaws of a 5500 Instron tensile strength machine and the maximum breaking load in grams or Newtons is recorded. If the breaking load is measured in Newtons it is converted to grams by multiplying it by 101.9. Six results in grams are obtained for each set of samples: G1 G2 G3 G4 G5 and G6 for the first set of samples and G7 G8 G9 G10 G11 and G12 for the second set of samples.

The Ordinary Parting Strength is calculated from the first set of samples using the formula Ordinary Parting Strength= (G1+G2+G3+G4+G5+G6)/W1.

The Weathered Parting Strength is calculated from the second set of samples using the formula Weathered Parting Strength=(G7+G8+G9+G10+G11+G12)/W2.

Second Comparative Testing on Insulation Product:

| Product used for test: | glass wool fibre insulation product, nominal density 7.2 kg/m³, nominal thickness 159 mm |
|---|---|

Samples: The Following Samples of Fibreglass Batts were Tested:

| Example | Binder Description | Target binder content (LOI) for product |
|---------|-------------------|------------------------------------------|
| PF2 | standard phenol formaldehyde binder of Resin, Urea, Ammonia, Silane | 4.5% |
| 2.1 | Dextrose 85% Ammonium Sulphate 15% Silane 0.3% (10.6% solids in binder solution) | 4.5% |
| 2.2 | Dextrose 85% Ammonium Sulphate 15% Silane 0.3% Norjohn oil (11.4% solids in binder solution) | 4.5% |
| 2.3 | Dextrose 85% Ammonium Sulphate 15% Silane 0.3%, 2.4% NH3 (10.6% solids in binder solution) | 4.5% |
| 2.4 | Dextrose 85% Ammonium Sulphate 15% Silane 0.3%, 2.4% NH3 (10.6% solids in binder solution) | 6.0% |

Results

|  | PF2 | 2.1 | 2.2 | 2.3 | 2.4 |
|---|---|---|---|---|---|
| Recovery | 158 mm | 157 mm | 163 mm | 160 mm | 166 mm |
| Recovery. % nominal | 99.4% | 99.0% | 102.8% | 100.6% | 104.8% |
| Parting Strength (ASTM C-686) | 190.8 g/g | 131.7 g/g | 146.7 g/g | 159.9 g/g | 143.9 g/g |
| Parting strength after weathering (ASTM C-686 following conditioning for 7 days at 90° F., 90% relative humidity) | 145.9 g/g | 100.0 g/g | 110.3 g/g | 124.9 g/g | 114.3 g/g |

The invention claimed is:

1. A method of manufacturing a stone wool insulation product comprising sequentially:
   forming stone wool fibers from a molten mineral mixture;
   spraying a substantially formaldehyde-free, aqueous binder solution onto the stone wool fibers just after they have been formed so that residual heat of the stone wool fibers causes water in the aqueous binder solution to evaporate;
   collecting the stone wool fibers to which the binder solution has been applied to form a batt of stone wool fibers; and
   curing the batt comprising the stone wool fibers and the binder by passing the batt through a curing oven so as to provide a batt of stone wool fibers held together by a cured, thermoset, substantially formaldehyde-free, substantially water insoluble, nitrogenous polymer-containing binder;

to produce a stone wool insulation product which:

i) comprises less than 99% by weight and more than 80% by weight stone wool fibers; and ii) has a density greater than 15 kg/m$^3$ and less than 220 kg/m$^3$; and iii) has a quantity of binder greater than 1% and less than 15% by dry weight;

and wherein the aqueous binder solution sprayed onto the stone wool fibers comprises (i) a carbohydrate reactant comprising a reducing sugar or a carbohydrate reactant that yields a reducing sugar in situ under thermal curing conditions and (ii) at least 5% by dry weight of an acid precursor, wherein the acid precursor comprises a) oxygen and b) at least one of sulphur, phosphorus and nitrogen.

2. The method of claim 1, wherein the acid precursor comprises an ammonium salt.

3. The method of claim 1, wherein the acid precursor comprises an inorganic salt.

4. The method of claim 1, wherein the acid precursor comprises an ammonium sulphate.

5. The method of claim 1, wherein the acid precursor comprises an ammonium phosphate.

6. The method of claim 1, wherein the acid precursor comprises oxygen, sulphur and nitrogen.

7. The method of claim 1, wherein the acid precursor makes up between 5% and 25% by dry weight of the aqueous binder solution.

8. The method of claim 1, wherein the ratio by dry weight of the reducing sugar to acid precursor in the aqueous binder solution (expressed as dry weight of reducing sugar/dry weight of acid precursor) is in the range 2.5 to 13.

9. The method of claim 1, wherein the carbohydrate reactant has a dextrose equivalent value of at least 0.85.

10. The method of claim 1, wherein the reaction of the binder upon curing is essentially a Maillard type reaction.

11. The method of claim 1, wherein the binder solution further comprises at least one of:
- a silicon containing compound;
- at least one additive selected from: silanes, mineral oils, coupling agents, silicones, siloxanes, surfactants, hydrophilic additives, hydrophobic additives and waxes wherein the total quantity of the additives is less than 5% by weight excluding the weight of water present.

12. The method of claim 1, wherein the binder solution comprises a material selected from the group consisting of a polycarboxylic acid, a salt of a polycarboxylic acid, and an anhydride of a polycarboxylic acid.

13. The method of claim 1, wherein the binder solution comprises excess ammonia.

14. The method of claim 1, wherein the binder solution has a pH of greater than 7 when sprayed onto the stone wool fibers.

15. The method of claim 1, wherein the binder solution as sprayed onto the stone wool fibers comprises at least 5% solids and less than 20% solids.

16. The method of claim 1, wherein the binder solution is sprayed onto the stone wool fibers when the stone wool fibers are at a temperature of between 30° C. and 150° C.

17. The method of claim 1, wherein curing of the binder is carried out by passing the batt through at least one zone of a curing oven at a temperature within the range 230° C.-300° C. with an oven residence time in the range 30 seconds to 20 minutes.

18. The method of claim 1, further comprising compressing the cured batts in a pack.

19. A method of manufacturing a stone wool insulation product comprising sequentially:

forming stone wool fibers from a molten mineral mixture;

spraying a substantially formaldehyde-free, aqueous binder solution which comprises at least 5% solids and less than 20% solids onto the stone wool fibers just after they have been formed so that residual heat of the stone wool fibers causes water in the aqueous binder solution to evaporate;

collecting the stone wool fibers to which the binder solution has been applied to form a batt of stone wool fibers; and curing the batt comprising the stone wool fibers and the binder by passing the batt through at least one zone of a curing oven at a temperature within the range 230° C.-300° C. with an oven residence time in the range 30 seconds to 20 minutes so as to provide a batt of stone wool fibers held together by a cured, thermoset, substantially formaldehyde-free, substantially water insoluble, nitrogenous polymer-containing binder;

to produce a stone wool insulation product which:

i) comprises less than 99% by weight and more than 80% by weight stone wool fibers; and ii) has a density greater than 15 kg/m$^3$ and less than 220 kg/m$^3$; and iii) a quantity of binder greater than 1% and less than 15% by dry weight;

and wherein the aqueous binder solution sprayed onto the stone wool fibers comprises (i) a carbohydrate reactant comprising a reducing sugar or a carbohydrate reactant that yields a reducing sugar in situ under thermal curing conditions and (ii) at least 5% by dry weight of an acid precursor in the aqueous solution, wherein the acid precursor comprises a) oxygen and b) at least one of sulphur, phosphorus and nitrogen;

and wherein the reaction of the binder upon curing is essentially a Maillard type reaction.

20. The method of claim 19, wherein the binder solution further comprises at least one of:
- a silicon containing compound; and
- at least one additive selected from: silanes, mineral oils, coupling agents, silicones, siloxanes, surfactants, hydrophilic additives, hydrophobic additives and waxes.

* * * * *